United States Patent Office 3,288,766
Patented Nov. 29, 1966

3,288,766
POLYEPOXIDE PRODUCTS CURED WITH SULFUR CONTAINING POLYACID COMPOUNDS
Sylvan O. Greenlee, West Lafayette, Ind., and Charles L. Weidner, Cranbury, and Guy J. Crocker, North Brunswick, N.J., assignors, by mesne assignments, to Ciba Limited, Basel, Switzerland, a Swiss corporation
No Drawing. Filed Jan. 27, 1961, Ser. No. 85,437
6 Claims. (Cl. 260—835)

This invention relates to a novel method for curing polyepoxides and to novel conversion products employing a polyepoxide as one of the reactants. More particularly, this invention relates to a novel method for curing polyepoxides by employing as the curing agent a polyacid of the type described hereinafter. The invention also includes novel conversion products formed by the reaction of a polyepoxide and a polyacid of the aforementioned type.

It is known that certain acids and acid anhydrides may be used as curing agents for certain polyepoxides, such as glycidyl polyethers of polyhydric phenols. Such curing agents have certain undesirable properties which have placed a considerable limitation on their commercial utilization as curing agents for the polyepoxides. More particularly, these curing agents show little activity in the cure of the polyepoxides at room temperature or at slightly elevated temperatures and are effective only at very elevated temperatures. Accordingly, it is not possible to use such curing agents in compositions that are to be cured at room temperature or in composition which are deleteriously affected at very high temperatures. Also, certain of the curing agents of the acid and anhydride type react slowly even at high temperatures and are not useful in composition which must be cured rapidly.

It is also known that certain amines may be used as curing agents for certain polyepoxides. While amine curing agents react at room temperature and hence do not have the aforementioned drawbacks of the acid or anhydride curing agents which require very high temperatures to react, the amine type of curing agents have limitations in that they are not reactive with a number of the non-glycidyl ether type commercial polyepoxides. Also, low temperature cured amine-polyepoxide conversion products are deficient in acid resistance and solvent resistance.

Objects and advantages of the invention will be set forth in part hereinafter and in part will be obvious herefrom, or may be learned by practice of the invention, the same being realized and attained by means of the steps, methods and compositions pointed out in the appended claims.

The invention consists in the novel steps, methods and compositions herein shown and described.

It is an object of this invention to provide a novel method for curing polyepoxides. A further object is to provide a novel method for curing polyepoxides employing polyacids of the olefin-mercapto acid addition type as curing agents. A still further object of this invention is to provide a novel method for curing polyepoxides that gives the desired cure at room temperature. A further object is to provide a novel method for improving the cure of polyepoxides at elevated temperatures. Yet a further object of this invention is to provide a novel method for curing polyepoxides which is quite versatile with respect to the polyepoxide that may be cured. A still further object of this invention is to provide a novel method for curing polyepoxides without causing discoloration of the polyepoxide that is cured.

A still further object of this invention is to provide novel polyepoxide conversion products. A further object of this invention is the production of novel polyepoxide conversion products by the reaction of a polyepoxide and a polyacid of the olefin-mercapto acid type. A further object of this invention is the production of novel polyepoxide conversion products which have good solvent and acid resistance, hardness, toughness, color stability, flexibility and other desirable properties. A still further object of this invention is the production of novel reactive solution mixtures of polyepoxides and polyacids of the olefin-mercapto acid addition type for use in making protective coatings, films, varnishes, adhesives, and many other uses. A still further object of this invention is the production of molding mixtures, potting compounds and other compositions capable of conversion into infusible articles and products, and the production of such articles and products.

It has been found that the objects of this invention may be realized by employing as curing agents for polyepoxides a polyacid containing at least one thioether group and at least two carboxylic acid groups. The aforementioned curing agents are generally made by the reaction of an organic compound containing terminal olefin groups and a mercapto acid to give a polyacid product having the general formula:

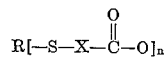

wherein X is selected from the group consisting of alkylene and substituted alkylene groups; and wherein R is an n-valent group selected from the group consisting of:

(1) n-valent groups which may be considered as having been formed by removal of n hydrogen atoms from an organic compound selected from the group consisting of hydrocarbons, ethers, esters, polyethers and polyesters, and (2) n-valent substituted derivatives of such n-valent groups; wherein the n free valence bonds are attached to n different carbon atoms, each of said carbon atoms having an attached carbon atom having an attached hydrogen atom and having all four valences satisfied, each such pair of carbon atoms being a part of a group selected from the group consisting of aliphatic and non-aromatic carbocyclic groups; and wherein n is at least one; and wherein when n is one then R has at least one carboxyl group as a substituent.

In the foregoing formula, in obtaining the desired polyacids containing at least two carboxylic groups, one of the carboxylic groups may be in the R group. Particularly useful as curing agents are diene polymers, such as butadiene polymers or copolymer-mercapto acid addition products wherein the butadiene polymer or copolymer has a large proportion of terminal, i.e., 1,2-addition, units. As employed herein, the term "butadiene" is intended to embrace both butadiene and its homologues while the term "butadiene polymers" is intended to include butadiene homopolymers and the copolymers of butadiene with other monomers. As is well known to those skilled in the art, butadiene reacts to form polymers composed of 1,2- and 1,4-addition units, each unit being a C₄ chain containing a double bond as follows:

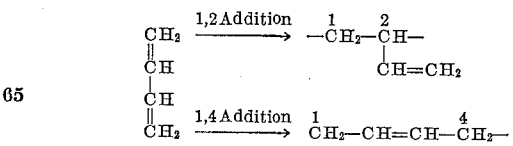

Examples of olefins containing a high percent of terminal (external or vinyl) olefin groups, are polyenes such as "Buton 100" and "Butarez" polymers. These polyenes reportedly contain 55–65% butadiene units as terminal olefin groups and 45–35% of the butadiene units as internal olefin containing units. "Buton 100" made by Enjay Chemical Company is a liquid butadiene-styrene copolymer of low molecular weight (8,000–10,000) and high unsaturation (iodine number approximately 300). "Butarez" polymer, made by Phillips Petroleum Company, are liquid butadiene polymers which contain on the average 0.8 double bond per $C_4$ unit giving iodine values of 375 to 400, these polymers having molecular weights in the range of 1000 to 2500. Butarez 5 has a viscosity of 36–37 poises at 25° C. and 5.5 poises as a 90% solution in toluene at 25° C. Butarez 150 has a viscosity of 63–65 poises as a 90% solution in toluene at 25° C. Butarez A. has a molecular weight of around 1800, a viscosity of 90–100 poises at 25° C.

Although butadiene polymers or copolymers having high 1,2-addition are particularly useful, polymers having relatively much lower 1,2-addition are quite useful for certain purposes especially when highly elastic and rubbery cured products are needed. Examples of this type are the SBR's (styrene-butadiene rubbers) commonly manufactured and sold in the United States by many companies. While these are similar chemically to the "Buton 100" mentioned previously, they differ in being much higher in molecular weight (100,000 or more), elastomeric solids rather then viscous liquids, and in having relatively less 1,2-addition (20 or 30 percent rather than 60%). A specific example is "Naugapol 1022," manufactured by Naugatuck Chemical Division of U.S. Rubber Co. This is a styrene-butadiene copolymer containing 23.5% bound styrene, hot polymerized, stabilized with a non-staining antioxidant, glue-acid coagulated, having a Mooney viscosity ML–4 min. at 212° F. of 70–85.

When the polyepoxide conversion products of this invention are used as coating compositions, it is preferred that the butadiene polymer used in forming the polyacid curing agent have a relatively low molecular weight (e.g., less than 25,000). When the polyepoxide conversion products are used as adhesives, however, the butadiene polymer used in forming the polyacid curing agent may have a much higher molecular weight.

Additional curing agents which may be used are those derived from the reaction of (1) polyallyl ethers of polyhydric alcohols, such, for example, as pentraerythritols, mannitol, sorbitol, glycerol and starches and (2) mercapto acids. Also useful as polyacid curing agents are the reaction products of mercapto acids with polyallyl esters of polybasic acids (e.g., phthalic, maleic, citric and pyromelletic acids). Other valuable allyl esters for reaction with the mercapto acids are the allyl esters of copolymers of maleic anhydride and styrene. Also useful as curing agents are the reaction products of mercapto acids and unsaturated polyesters, such as the esters of maleic and fumaric acid with glycols. Additional curing agents are those formed by the reaction of an unsaturated acid (e.g., undecanoic acid) and a mercapto acid.

In addition to the aforedescribed polyacid curing agents, another curing agent which may be used is that formed by the reaction of a cyclopentadiene such, for example, as dicyclopentadiene, with a mercapto acid.

The preferred mercapto acid in forming the polyacid curing agents of this invention is mercaptoacetic acid. This acid exhibits high reactivity with olefins in forming polyacid addition products. Beta mercaptopropionic acid, while less reactive than mercaptoacetic acid with a polyene, gives good yields of polyacids in reaction with polyenes. Examples of other acids which may be used in forming polyacid curing agents are mercaptobutyric acid and mercaptopentanoic acids.

The polyepoxides cured in accordance with this invention are those containing more than one epoxide group per molecule.

Illustrative of the epoxide compositions which may be employed in this invention are the complex epoxide resins which are polyethers formed by reacting polyhydric phenols with such polyfunctional materials as polyhalohydrins, polyepoxides, or epihalohydrins to form polymeric materials having alternating aliphatic chains and aromatic nuclei connected to each other by ether linkages. Typical of these complex expoxide resins are the reaction products of bis (4-hydroxyphenyl) dimethyl methane (bisphenol A) with excess molar portions of epichlorohydrin.

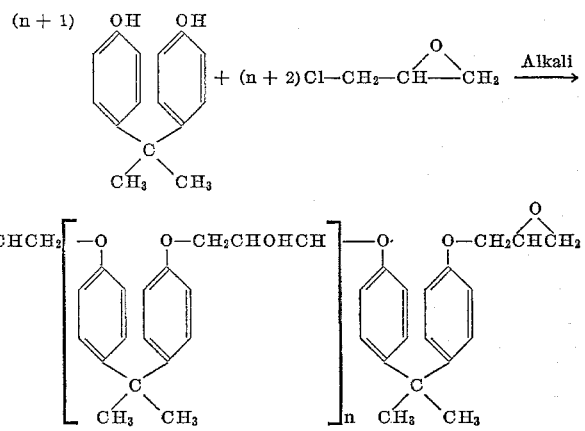

As used in the above formula, $n$ indicates the degree of polymerization and may have the value of 0 or a positive whole number. Typical of these complex epoxide resins are those marketed by the Shell Chemical Corporation under the trade names of Epon 828, Epon 838, Epon 1001, Epon 1004, Epon 1007, Epon 1009, and Epon 1031.

Another group of resinous polyepoxides useful in reaction with olefin-mercapto acid adducts are the glycidyl ethers of phenol formaldehyde condensates.

The epoxide compositions which may be used in preparing the compositions of this invention also include aliphatic polyepoxides which may be illustrated by such polyepoxides as the polymerization products obtained by polymerizing epoxyalkyl alkenyl ethers such as allyl glycidyl ether through the unsaturated portion to give the so-called polyallyl glycidyl ether (PAGE) having a chemical structure corresponding closely to the following formula:

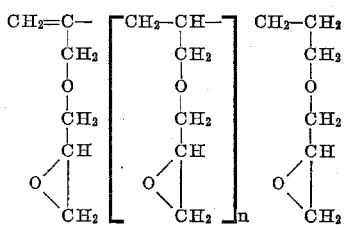

These products in which $n$ is an integer from 0 to about 7 are available in experimental quantities from the Shell Chemical Corporation.

Still other aliphatic polyepoxides which may be used are illustrated by the poly (epoxyalkyl) ethers of polyhydric alcohols. These polyepoxides, for instance, may be obtained by reacting a polyhydric alcohol with an epihalohydrin followed by dehydrohalogenation. Illustrative is the reaction, for example, of epichlorohydrin with glycerol in the presence of boron trifluoride to give an intermediate chlorohydrin which is dehydrohalogenated to give a mixed product as illustrated by the following typical reaction:

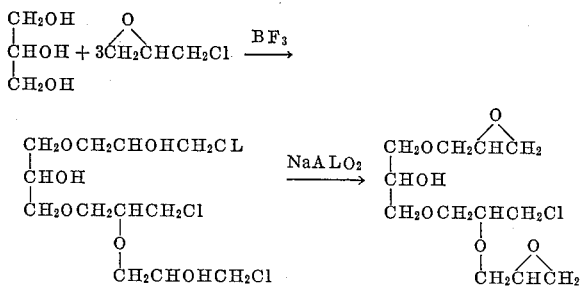

A commercial product of this type is Epon 812 made by Shell Chemical Corporation and having an equivalent weight to epoxide of approximately 150. The preparation of a large number of these mixed polyepoxides is described more fully in Zech's U.S. Patent 2,581,484.

Still other aliphatic polyepoxides which have been found to be valuable in reaction with the olefinmercapto acid adducts in producing the cured products of this invention include diepoxybutane, diglycidyl ether, limonene diepoxide, and diepoxydicyclopentadiene.

Examples of commercial polyepoxides are as follows:

Epon 1001: A bisphenol A-epichlorohydrin type polyepoxide having a softening point of 64–76° C. and an epoxide equivalent weight of 450–525.

Epon 828: A bisphenol A-epichlorohydrin type polyepoxide having a softening point of 8–12° C. and an epoxide equivalent weight of 190–210.

Epon X–701: A liquid polymer of allyl glycidyl ether described as polyallyl glycidyl ether (PAGE) having an epoxide equivalent weight of approximately 135.

Epon 812: A glycidyl ether prepared from the reaction of epichlorohydrin with glycerol containing an equivalent weight to epoxide of approximately 150.

Epoxidized glycerides such as epoxidized soya bean oil manufactured by Swift & Company an sold under the trade name "Epoxol 7–4."

Epoxidized butadiene polymers such as "Oxiron 2000" manufactured by Food Machinery and Chemical Corporation.

The following Examples A–J illustrate the preparation of polyacids containing at least two carboxylic groups and at least one thioether group which are useful as curing agents in accordance with the present invention.

*Example A*

This example illustrates the preparation of a polyacid curing agent, hereinafter referred to as "Polyacid A," formed by the reaction of mercaptoacetic acid and "Butarez A."

In a 5 liter 3 neck flask provided with a mechanical stirrer, a thermometer and a heating mantle was placed 500 grams of Butarez A in 1000 grams of toluene. With constant stirring 680 grams of mercaptoacetic acid (MAA) was added in portions over a period of 30 minutes while the pot temperature rose from 26° C. to 37° C. from the exothermic reaction. The reaction mixture was then held at 37–45° C. for 1 hour, at 45–60° C. for 1 hour at 60–68° C. for 6.5 hours, allowed to stand for 24 hours at room temperature. To remove the MAA, a water-cooled receiver was attached and the pot temperature was gradually increased from room temperature to 150° C. and then held at 150–160° C. while reducing the pressure to 25 mm. of mercury with a water pump and finally to 2 mm. of mercury with a vacuum pump to free the adduct of unreacted MAA. The recovered product amounted to 809 grams of an amber colored semisolid having an acid value of 270.

*Example B*

This example illustrates the preparation of a polyacid curing agent, hereinafter referred to as "Polyacid B," formed by the reaction of mercaptoacetic acid and dicyclopentadiene.

In a 1 liter, 3 neck flask provided with a mechanical stirrer, a thermometer and a heating mantle was placed 132 grams of dicyclopentadiene. With continuous stirring 184 grams of MAA was added over a period of 17 minutes while the temperature rose from 25° C. to 50° C. from the exothermic reaction. The temperature was held at 48–50° C. for the remainder of 1 hour, increased to 75° C. and held for 2 hours and then increased to 100° and held for an additional 2 hours. A water-cooled receiver was then attached and the volatile materials removed by increasing the pot temperature to 150° C. and holding at 150–160° C. while reducing the pressure to 20 mm. of mercury with a water pump and finally to 3 mm. with a vacuum pump. An amber colored, viscous liquid product (270 grams) having an acid value of 273 remained as the non-volatile residue.

*Example C*

This example illustrates the preparation of a polyacid curing agent, hereinafter referred to as "Polyacid C," formed by the reaction of mercaptoacetic acid and "Buton-100."

In a 2 liter 3 neck flask provided with a mechanical stirrer, a thermometer and a heating mantle was placed 333 grams of Buton-100 and 333 grams of toluene. With continuous stirring 200 grams MAA was added at once. The temperature rose from 25° C. to 65° C. over a period of 5 minutes due to the exothermic reaction. The reaction mixture was held at 60–65° C. for 1 hour and 100–101° C. for 1 hour after which the unreacted MAA was removed by gradually increasing the temperature to 160° C. while reducing the pressure to 17 mm. of mercury. A light straw colored, sticky solid product amounting to 520 grams and having an acid value of 217 remained as the non-volatile residue.

*Example D*

This example illustrates the preparation of a polyacid curing agent, hereinafter referred to as "Polyacid D," formed by the reaction of mercaptoacetic acid and "Buton-100."

A mixture of 66.6 grams of Buton-100, 106.6 grams of methyl isobutyl ketone and 40 grams MAA was stirred together in a 500 ml. bottle. From exoethermic reaction the temperature rose from 25° to 63° C. After standing for 15 hours the solution had a viscosity of 3 poises and an acid value based on the non-volatile content of 236. This reaction product without purification was found to be satisfactory for reaction with polyepoxides such as Epon 828 to give room temperature curing coatings.

*Example E*

This example illustrates the preparation of a polyacid curing agent, hereinafter referred to as "Polyacid E," formed by the reaction of mercaptopropionic acid (MPA) and "Buton-100."

In a 5 liter, 3 neck flask provided with a mechanical stirrer, a thermometer and a heating mantle was placed 500 grams of Buton-100, 600 grams of toluene and 230 grams of MPA. With continuous stirring the reaction mixture was raised to 60° C., held at 60–76° C. for 1 hour, heated to 107° C. and held for 3 hours. A water-cooled receiver was attached and the pot temperature gradually increased to 160° C. while reducing the pressure to 20 mm. of mecury with a water pump and finally to 2 mm. with a vacuum pump. The light straw colored, sticky solid residue amounting to 719 grams had an acid value of 175.

*Example F*

This example illustrates the preparation of a polyacid curing agent, hereinafter referred to as "Polyacid F," formed by the reaction of mercaptoacetic acid and 10-undecenoic acid.

In a 2 liter 3 neck flask was placed 184 grams of 10-undecenoic acid in 200 grams of dioxane (freshly distilled from sodium). With continuous stirring 92 grams of MAA was added at once. The temperature rapidly rose to 60° C. requiring external cooling to hold this temperature. The temperature was held at 55–60° C. for 1.5 hours, at 75° C. for 1 hour and at 100° C. for 1 hour. Separation of white crystalline material started early in the reaction period. A water-cooled receiver was attached and the volatile material removed by gradually raising the pot temperature to 192° C. while reducing the pressure to 20 mm. of mercury with a water pump and finally to 3 mm. with a vacuum pump. The residue amounting to 256 grams had an acid value of 379 and after recrystallization from benzene had an acid value of 395 and an uncorrected capillary melting point of 99–100° C. The theoretical acid value for an adduct of these reactants in an equal molar amount is 398. The MAA could add to give 10-carboxymethyl undecanoic acid or the 11-carboxymethyl undecanoic acid. A possible formula for the adduct is:

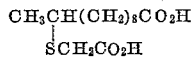

*Example G*

This example illustrates the preparation of "Polyacid G" formed by the reaction of diallyl ether and mercaptoacetic acid. Diallyl ether (1 mol) in 100 grams dioxane (freshly distilled from sodium) was stirred and cooled while adding slowly 3 mols of MAA. The reaction mixture was held at 55–60° C. for 1 hour, at 75–80° C. for 2 hours and at 100–105° C. for 1 hour. The unreacted material was then removed by gradually lowering the pressure to 3 mm. of mercury while the pot temperature rose to 150° C. The viscous liquid "Polyacid G," 275 grams, had an acid value of 385.5 (eq. wt.=146; Th. eq. wt.=141).

*Example H*

This example illustrates the preparation of "Polyacid H" formed by the reaction of diallyl maleate and mercaptoacetic acid. Diallyl maleate (0.5 mol) in 100 grams dioxane was treated with 2 mols of MAA as in Example G to give 220 grams of a viscous liquid "Polyacid H" having an equivalent weight of 160 as compared to a theoretical equivalent weight for a tribasic acid of 159.

It will be noted that this reaction involves 1 nonterminal olefin group which is activated by adjacent ester groups. The product appears to be

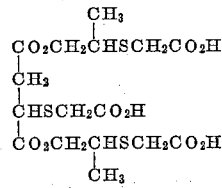

*Example I*

This example illustrates the preparation of "Polyacid I" formed by the reaction of diallyl phthalate and mercaptoacetic acid. Diallyl phthalate (0.5 mol) in 100 grams dioxane treated with 1.5 mols MAA as in Example G gave 227 grams of a viscous liquid "Polyacid I" having an equivalent weight of 212 (Th. eq. wt.=215).

*Example J*

This example illustrates the preparation of "Polyacid J" formed by the reaction of an unsaturated polyester and mercapto acid to give "Polyacid J."

In forming the aforementioned polyester a mixture of 147 parts maleic anhydride, 148 parts succinic anhydride and 350 parts of diethylene glycol and sufficient toluene to give constant reflux was esterified to an acid value of 15 by heating with stirring for 4.5 hours at 200–205° C. catching the water liberated in a Dean-Stark water trap. A mixture of this liquid polyester with 150 parts mercaptoacetic acid was heated with stirring to 100° C. and held at this temperature for 1 hour followed by vacuum stripping to 3 mm. pressure and a pot temperature of 150° C. The residual "Polyacid J" had an equivalent weight to acid of 560.

*Example K*

This example illustrates the preparation of "Polyacid K" formed by the reaction of a commercial rubber product with mercaptoacetic acid. In a 5 liter, 3 neck flask provided with a thermometer, a mechanical stirrer, a water-cooled condenser and a heating mantle was placed 3000 parts by weight of a 15% solution of "Naugapol 1022" in toluene and 155 parts MAA. The mixture was heated with continuous agitation at 100° C. for 6 hours to give an acid value of 30.5 or an equivalent weight to acid on the solution (18%) of 1840 (eq. wt. on nonvolatile would be 331).

As indicated hereinbefore, the polyacid curing agents used in the present invention are effective agents for curing polyepoxides. The following examples are given to illustrate curing of the polyepoxides in accordance with the present invention. In the following examples, the curing agent and polyepoxide reactants were dissolved in a suitable solvent, e.g., methyl isobutyl ketone (MIBK), to a non-volatile content of 40% by weight. In each example, equivalent amounts of curing agent and polyepoxide were employed.

*Example 1*

"Polyacid C" (eq. wt. 260) was mixed with one equivalent of "Epon 828" (eq. wt. 190) in MIBK solvent. The mixture was spread in films of 0.003 inch wet thickness and observed to become tack free at room temperature as shown in Table 2.

*Example 2*

"Polyacid C" (eq. wt. 260) was mixed with one equivalent of vinyl cyclohexene diepoxide (eq. wt. 70) in MIBK solvent and spread in 0.003 inch films which became tack free at room temperature as shown in Table 2.

*Example 3*

"Polyacid D" (eq. wt. 260) was mixed with one equivalent of "Epon 828" (eq. wt. 190) in MIBK solvent and spread in 0.003 inch wet film which became tack free at room temperature as shown in Table 2.

In Table 1 are shown typical viscosity increases which occur in Examples 1–3 on standing at room temperature. In each instance the viscosity was measured by the Gardner Bubble Tube Viscometer. The result shown in Table 1 indicates that the package stability is sufficiently long for the formulation of practical coatings.

TABLE 1

| Example No. | Initial | 1 hr. | 2 hr. | 3 hr. | 4 hr. | 5 hr. |
|---|---|---|---|---|---|---|
| 1 | C | E | I | R | W | $Z_3$ |
| 2 | G | L | T | X | $Z_3$ | |
| 3 | A | B-C | D | H | M | V |

Observation of the drying speed of the foregoing compositions are shown in Table 2.

TABLE 2

| Example No. | Tack Free, hours | Finger Print Free, hours | Rocker Hardness after— | |
|---|---|---|---|---|
| | | | 10 hrs. | 24 hrs. |
| 1 | 4 | 5 | 18 | 24 |
| 2 | 4 | 5 | 28 | 56 |
| 3 | 4 | 5 | 18 | 40 |

The following Example 4 relates to the conversion of an "Oxiron 2000" by "Polyacid F."

Example 4

"Polyacid F" (eq. wt. 141) was mixed with an equivalent weight of "Oxiron 2000" (eq. wt. 177) in MIBK solvent. Films of 0.003 inch wet thickness at 100° C. gave conversion within 1–2 hours.

The polyacid curing agents have been found to exhibit great versatility in reacting with polyepoxides of varying type. In order to illustrate this, "Polyacid C" (equivalent weight=260) and "Versamid 115" (used at an equivalent weight of 275), respectively, were each mixed with an equivalent weight of a number of polyepoxides and evaluated for their reactivity with various epoxides at room temperature (RT) and 150° C. using 50% solutions of the reactants in methyl isobutyl ketone and spreading on glass plate, films of 0.003 inch wet thickness. "Versamid 115" is an aminoamide curing agent derived from the reaction of dimerized soya bean oil acids with a polyethylene polyamine. This is commercially available from the General Mills Company. Table 3 gives the comparative curing results.

In Table 3, the plus (+) sign means the compositions under consideration was converted to a tack free surface and the minus (−) sign means the film did not convert to the tack free state.

TABLE 3

| | Polyacid C | Versamid 115 |
|---|---|---|
| Glycidyl ethers: | | |
| At room temperature (RT) | 4 hours | 5 hours. |
| ½ hr. at 150° C | + | +. |
| Vinyl Cyclohexene Diepoxide: | | |
| RT | 3 hours | −. |
| ½ hr. at 150° C | + | −. |
| Limonene Diepoxide: | | |
| RT | 24 hours | −. |
| ½ hr. at 150° C | + | −. |
| Dicyclopentadiene Diepoxide: | | |
| RT | 24 hours | −. |
| ½ hr. at 150° C | + | −. |
| Oxiron 2000 (FMC): | | |
| RT | 72 hours | −. |
| ½ hr. at 150° C | + | −. |
| Epoxidized Soya Oil: | | |
| RT | 72 hours | −. |
| ½ hr. at 150° C | + | −. |

Polyepoxide conversion products formed in accordance with this invention have been found to possess outstanding solvent resistance. These products were also found to be highly acid resistant. In order to illustrate this, one equivalent of polyepoxide ("Epon 828") was mixed with "Versamid 115" (eq. wt. 275) and Poly Acid C (eq. wt. 260), respectively, in MIBK solvent. Films of the resulting compositions (0.003″ wet thickness) were let stand for 5 days at room temperature before testing. The results obtained are reported in Table 4. In Table 4 the number of hours are given for the period withstood by the film before breakdown or the number followed by a + sign indicates end of test period with no indication of film breakdown. The abbreviation "MEK" referes to methyl ethyl ketone while "MIBK" refers to methyl isobutyl ketone.

TABLE 4

| | Temperature,° C. | Epon 828 Versamid 115 | Epon 828 Polyacid C |
|---|---|---|---|
| $H_2O$ | 25 | 72+ | 72+ |
| 10% NaOH | 25 | 72+ | 0.25 |
| 50% $H_2SO_4$ | 25 | ¹72+ | 72+ |
| 50% $H_2SO_4$ | 100 | 0.5 | 24+ |
| Glacial Acetic Acid | 25 | 0.0 | 72+ |
| Dimethyl formamid | 25 | 0.0 | 0.0 |
| Acetone | 25 | 24.0 | 72+ |
| MEK | 25 | 2.0 | 72+ |
| MIBK | 25 | 72+ | 72+ |
| Toluene | 25 | 24 | 72+ |
| Mineral Spirits | 25 | 72+ | 72+ |
| Conc. $NH_4OH$ | 25 | 72+ | 3.5 |

¹ But whitened immediately.

From the results reported in Table 4, it is seen that the conversion products formed in accordance with the invention possess superior acid and solvent resistance to Versamid conversion products, while the latter possess better alkali resistance.

Also, it has been found that polyepoxide conversion products formed in accordance with this invention possess good color retention on baking. Examples of conversion products having excellent color stability on baking and which do not yellow on aging are the polyacid conversion products of Epon 828, Epon 1001, Oxiron 2000 and vinyl cyclohexene dioxide.

The following are additional examples of curing systems in accordance with this invention.

Example 5

"Polyacid G" (eq. wt. 146) was mixed with one equivalent of polyallyl glycidyl ether (eq. wt. 135) in a suitable solvent (MIBK). The polyepoxide cured in ½ hour at 100° C. or in 4 days at room temperature to a tack free film.

Example 6

"Polyacid H" (eq. wt. 160) was mixed with one equivalent of "Epon 828" (eq. wt. 190) in a suitable solvent (MIBK). The polyepoxide was cured in 4–5 days at room temperature.

As indicated heretofore, polyepoxide compositions cured in accordance with this invention are useful in the production of potting compositions.

The following Example 7 illustrates the preparation of a molded product.

Example 7

Samples of ½ inch thickness were formulated by mixing together 2 parts of "Polyacid C" (eq. wt. 260) and 1 part of di-butoxyethyl adipate by heating to 70° C. and stirring, cooling to 30° C. and mixing with 1 epoxide equivalent of Epon 828 (eq. wt. 190) per each equivalent of "Polyacid C". The ½ inch thick samples became tack free and hard on standing at 25° C. for 15 hours, or on heating for 5 hours at 65° C.

Example 8 shows the epoxide curing characteristic of an adduct of a rubber and mercaptoacetic acid.

Example 8

A mixture of 18.7 parts by weight of "Polyacid K" and 1.9 parts of Epon 828 spread in 0.003 inch wet film on glass plate converted to insolubility in toluene on baking for 15 minutes at 150° C.

Example 9

A mixture of one part by weight of "Polyacid K" solids (eq. wt. approximately 330), one part of Epon 1001 (eq. wt. 450–525) and one part of "Neoprene WRT" was prepared as a 20% non-volatile solution in toluene. "Neoprene WRT" is a polychloroprene elastomer manufactured by E. I. du Pont de Nemours and Co., Inc., and was included in the above composition as an elastomeric component to give added flexibility and elasticity. A 0.012″ wet film of the above composition was coated on a 0.001″ primed film of oriented polyethylene terephthalate polyester also made and sold by Du Pont under the trade name "Mylar." After drying to remove the volatile solvent the coated film was cured for 10 minutes at 300° F. A tough flexible non-tacky cured product was obtained which withstood immersion in toluene for 24 hours. This composition would be quite satisfactory as a flexible, tough, solvent resistant protective coating or bonding cement.

The invention in its broader aspects is not limited to the specific steps, methods and compositions described, but departures may be made therefrom within the scope of the accompanying claims without departing from the principles of the invention.

What is claimed is:

1. A polyepoxide conversion product formed by reacting a polyepoxide having a functionality of greater than one vicinal epoxy group per molecule with a stable polyacid containing at least two thioether groups, each of which is connected through a carbon chain to a carboxylic acid group, wherein said polyacid is a reaction product of a mercapto acid and a diene polymer.

2. A polyepoxide conversion product formed by reacting a polyepoxide having a functionality of greater than one vicinal epoxy group per molecule with a stable polyacid containing at least two thioether groups, each of which is connected through a carbon chain to a carboxylic acid group, wherein said polyacid is a reaction product of a mercapto acid and a cyclopentadiene.

3. A polyepoxide conversion product formed by reacting a polyepoxide having a functionality of greater than one vicinal epoxy group per molecule with a stable polyacid containing at least two thioether groups, each of which is connected through a carbon chain to a carboxylic acid group, wherein said polyacid is a reaction product of a mercapto acid and a polyallyl ether of a polyhydric alcohol.

4. A polyepoxide conversion product formed by reacting a polyepoxide having a functionality of greater than one vicinal epoxy group per molecule with a stable polyacid containing at least two thioether groups, each of which is connected through a carbon chain to a carboxylic acid group, wherein said polyacid is a reaction product of a mercapto acid and a polyallyl ester of a polybasic acid.

5. A polyepoxide conversion product formed by reacting a polyepoxide having a functionality of greater than one vicinal epoxy group per molecule with a stable polyacid containing at least two thioether groups, each of which is connected through a carbon chain to a carboxylic acid group, wherein said polyacid is a reaction product of a mercapto acid and unsaturated polyester.

6. A polyepoxide conversion product formed by reacting a polyepoxide having a functionality of greater than one vicinal epoxy group per molecule with a stable polyacid containing at least two thioether groups, each of which is connected through a carbon chain to a carboxylic acid group, wherein said polyacid is a reaction product of a mercapto acid and an allyl ester of a copolymer of maleic anhydride and styrene.

References Cited by the Examiner

UNITED STATES PATENTS

| | | | |
|---|---|---|---|
| 2,530,882 | 11/1950 | Jansen et al. | 260—481 |
| 2,559,521 | 7/1951 | Smith et al. | 260—537 |
| 2,581,514 | 1/1952 | Chilocte | 260—537 |
| 2,589,151 | 3/1952 | Serniuk | 260—79.5 |
| 2,712,535 | 7/1955 | Fisch | 260—47 |
| 2,831,830 | 4/1958 | Schroeder | 260—47 |

OTHER REFERENCES

Grant: "Hackh's Chemical Dictionary," 3rd ed., McGraw-Hill Book Co., Inc., 1944, page 310 relied on. (Copy in Div. 60.)

WILLIAM H. SHORT, *Primary Examiner.*

HAROLD BURSTEIN, *Examiner.*

A. LIBERMAN, S. N. RICE, *Assistant Examiners.*